United States Patent [19]

Waltz

[11] Patent Number: 4,855,874

[45] Date of Patent: Aug. 8, 1989

[54] LIGHT MODIFIER AND METHOD FOR MODIFYING LIGHT

[75] Inventor: Thomas A. Waltz, Sylvania, Ohio

[73] Assignee: The F. J. Westcott Company, Toledo, Ohio

[21] Appl. No.: 60,221

[22] Filed: Jun. 10, 1987

[51] Int. Cl.[4] .................. B60Q 1/06

[52] U.S. Cl. .................. 362/16; 362/362

[58] Field of Search .................. 362/16, 362; 126/438, 126/450, 426

[56] References Cited

U.S. PATENT DOCUMENTS 923,542 6/1909 Losey .
2,105,225 1/1938 Pollock .
2,193,485 3/1940 Kenning .
2,205,860 6/1940 Olds .
2,794,906 6/1957 Edgerton .
3,125,091 3/1964 Sleeper, Jr. .................. 126/426
3,182,654 5/1965 Culling .................. 126/451 X
3,294,962 12/1966 Hilzen .
3,429,320 2/1969 Edelkind .
3,781,535 12/1973 Larson .
3,851,164 11/1974 Intrator .
3,870,874 3/1975 Larson .
3,873,821 3/1975 Larson .
3,939,340 2/1976 Gozzano .
4,015,111 3/1977 Spector .................. 362/34
4,052,607 10/1977 Larson .
4,075,472 2/1978 Higuchi .
4,089,047 5/1978 Lüderitz .................. 126/438 X
4,126,123 12/1978 Hall .................. 126/426
4,187,531 2/1980 Lowell et al. .
4,203,420 5/1980 Schoenfelder .................. 126/426
4,428,030 1/1984 Baliozian .
4,443,837 4/1984 Migliori et al. .
4,446,506 5/1984 Larson .
4,460,946 7/1984 Tinz .
4,464,708 8/1984 Nussli et al. .
4,524,405 6/1985 Heard .
4,543,945 10/1985 Hattan .................. 126/426 X
4,594,645 6/1986 Terashita .
4,633,374 12/1986 Waltz .

FOREIGN PATENT DOCUMENTS 0159594 10/1985 European Pat. Off. .
1048681 12/1953 France .
104929 10/1985 Japan .

OTHER PUBLICATIONS

Chimera, No source or publication data available.

*Primary Examiner*—Larry Jones

*Attorney, Agent, or Firm*—Emch, Schaffer, Schaub & Porcello Co.

[57] ABSTRACT

A light modifier is disclosed that is intended to be used primarily for photographic purposes. The light modifier is used in conjunction with a light source to provide various types of diffused light for photographic purposes. The light modifier includes an inflatable structure having a translucent panel and a reflective panel. A passageway is connected to the inflatable structure and the passageway is in communication with the interior of the inflatable structure. The passageway is disposed for supplying a fluid under pressure to the interior of the inflatable structure. At least one closeable opening is positioned in the inflatable structure to provide access to the interior of the light modifier. A light source can be mounted in the interior of the light modifier. The light source can be aimed directly at the translucent panel or first reflected off the reflective panel to diffuse the light even more before it passes through the translucent panel. Also disclosed is a method for modifying light by positioning a light source inside of an inflatable light modifier. The light modifier has a translucent panel and a reflective panel. Air under pressure is supplied to inflate the light modifier. Air is exhausted from the light modifier through a vent hole to maintain airflow through the light modifier to cool the interior of the light modifier.

49 Claims, 3 Drawing Sheets

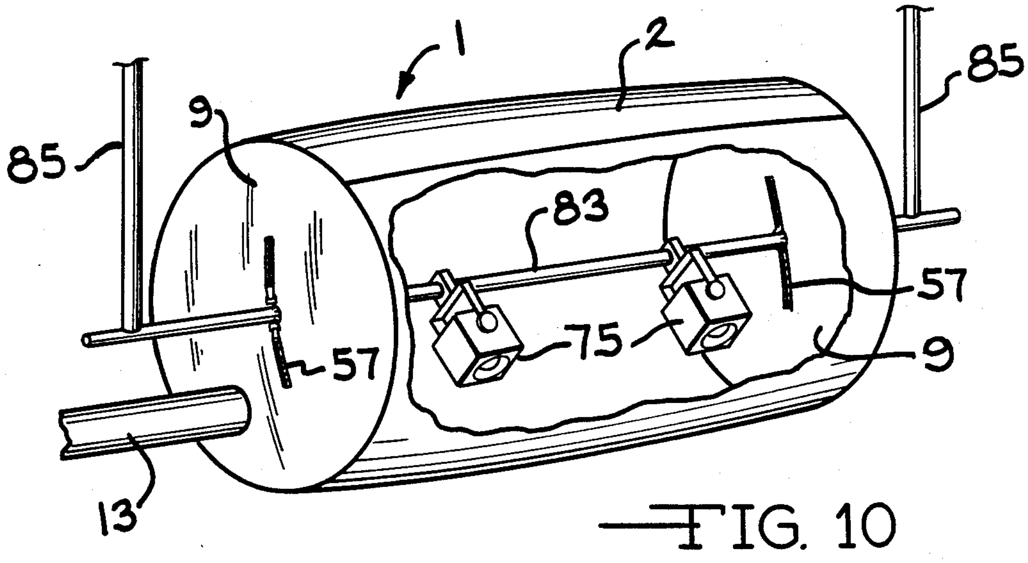
FIG. 10
FIG. 11
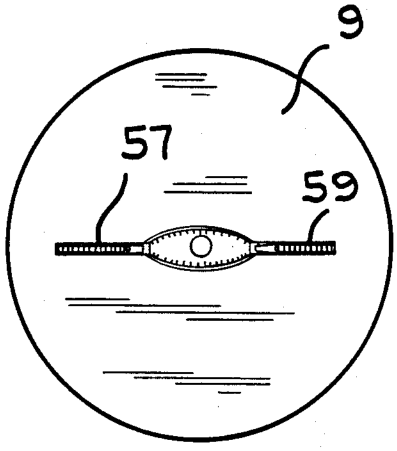
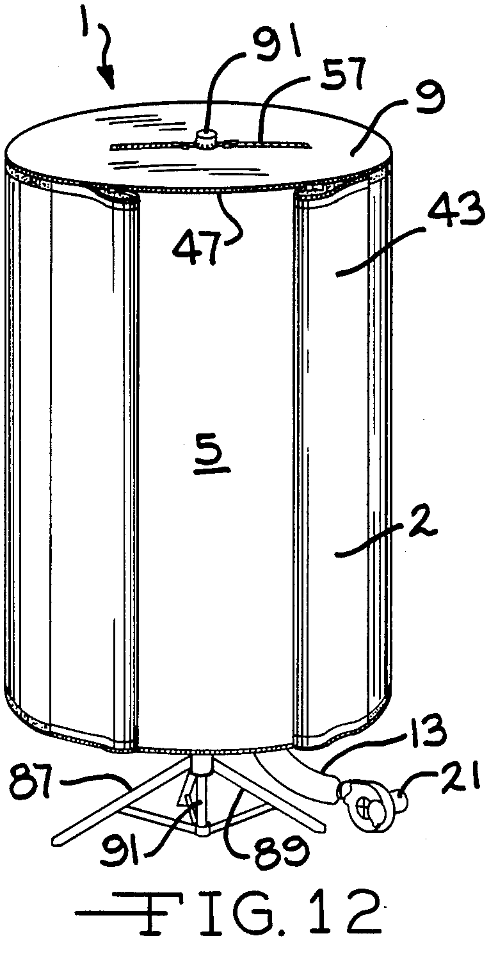
FIG. 12
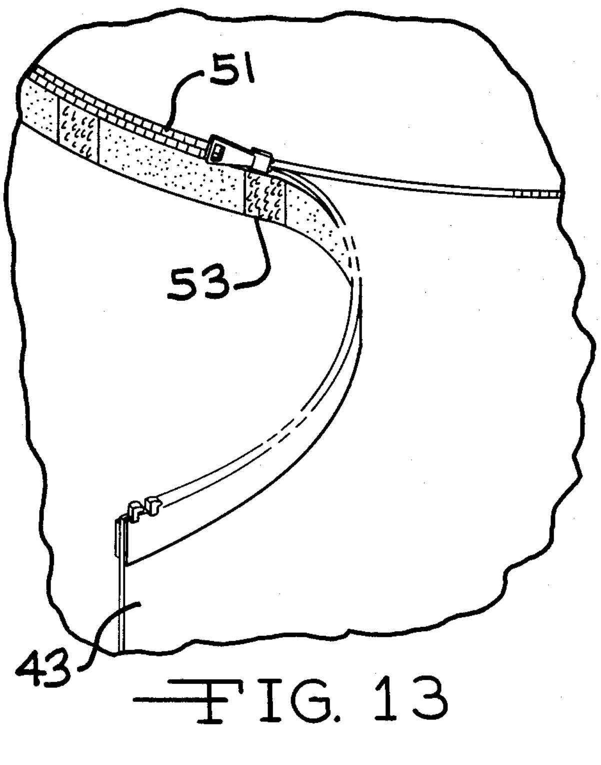
FIG. 13

LIGHT MODIFIER AND METHOD FOR MODIFYING LIGHT

BACKGROUND OF THE INVENTION

The present invention relates to a light modifier for use with light sources in photography. Diffused or indirect lighting is used both in still and motion picture type photography. To achieve an indirect soft type lighting effect it is desirable to first either directly or indirectly pass the light through a semi-transparent material to breakup or diffuse the light rays. Such lighting is generally produced by light sources which are remote from the camera.

Each particular area to be lighted will dictate the type and intensity of light that will be needed. In some situations direct light from the light source without any alteration may be required. In other situations other direct light may be too strong or cast overly distinct shadows in which case a more diffuse light is more desirable. In still other cases an even more indirect diffuse light may be needed to create the proper light effect.

The light modifier of the present invention is designed to illuminate large areas in a studio or set where large objects or several smaller objects are to be photographed. Frequently, such a light modifier will be suspended above the floor to produce the desired lighting effect. Also it is not unusual for several such large light modifiers to be used due to the size of the area that needs to be filled with the right intensity of light to allow a proper photograph to be taken. In the past light modifiers that have been used for such a purpose have been large structures with very heavy metal frameworks and supports. The light source could only be positioned on a particular mounting bracket and the modifier could not produce different types of lighting effects. These prior art modifiers were very bulky, difficult to assemble and difficult to transport. Frequently only one type of light source could be used with the modifier and the light source could only be positioned in a specific location on the modifier which limited the usefulness of the modifier. Accordingly, it is desirable to have a lightweight and easily moveable light modifier that can be easily positioned to produce the desired lighting effect. It is also desirable to have a large light modifier that can be stored in a compact area and be transported easily when the light modifier is not being used.

Accordingly, it is an object of the present invention to provide an improved photographic light modifier. It is a further object of the present invention to provide a light modifier that is usable with a wide variety of lighting sources.

It is a further object of the invention to provide a light modifier that is lightweight, compact when stored and can be easily transported.

Other objects and advantages of the present invention will become apparent from a further review of the following specification, drawings and claims.

SUMMARY OF THE INVENTION

The present invention relates to a light modifier that is intended to be used primarily for photographic purposes. The light modifier is used in conjunction with a light source to provide various types of diffused light for photographic purposes. The light modifier comprises an inflatable structure having a translucent panel and a reflective panel. A passageway is connected to the inflatable structure and the passageway is in communication with the interior of the inflatable structure. The passageway is disposed for supplying a fluid under pressure to the interior of the inflatable structure. At least one closeable opening is positioned in the inflatable structure to provide access to the interior of the light modifier. A light source can be mounted in the interior of the light modifier. The light source can be aimed directly at the translucent panel or first reflected off the reflective panel to diffuse the light even more before it passes through the translucent panel. Curtains or flaps can also be positioned on the light modifier adjacent the translucent panel. The curtains can be positioned over a portion of the translucent panel.

Also disclosed is a light modifier having a substantially cylindrical body portion formed of a translucent panel and a reflective panel. The reflective panel is disposed with its reflective surface facing the interior of the body portion. An end panel is positioned on each end of the body portion to enclosed the body portion. The end panels being formed from a dark material. At least one closeable opening is positioned in the light modifier to provide access to the interior of the light modifier. The closeable opening being positioned in the reflective panel of the body portion and is disposed substantially parallel to the longitudinal axis of the body portion. The closeable opening extending substantially the length of the body portion from one end panel to the other end panel. At least one light source is positioned in the interior of the body portion. The light source can be directed at the translucent panel to produce a level of diffused light and the light source can be directed at the reflective panel to produce a lower intensity of diffused light. The light from the light source passes through the translucent panel to produce the desired lighting on an object that is to be illuminated.

Further disclosed is a method for modifying light used for photographic purposes. The photographic light source is positioned inside of an inflatable light modifier. The light modifier has a translucent panel and a reflective panel. Air under pressure is supplied to the light modifier to inflate the light modifier. Air from the light modifier is exhausted through a vent hole to maintain airflow through the light modifier. The airflow acting to exhaust or remove heat from the interior of the light modifier from the photographic light source.

BRIEF DESCRIPTION OF THE DRAWINGS

FIG. 10 is a perspective view, partially broken away, of another embodiment of the light modifier invention.

FIG. 12 is a perspective view of another embodiment of the light modifier of the present invention.

FIG. 13 is a partial perspective view of a portion of the light modifier shown in FIG. 12.

DESCRIPTION OF THE PREFERRED EMBODIMENTS

Figure 1:
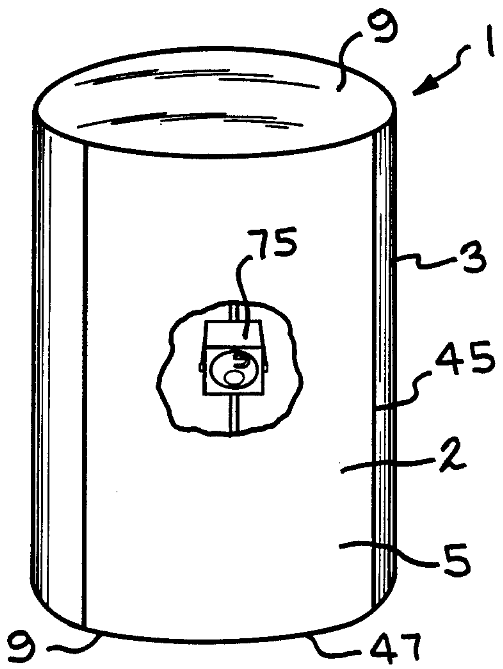
FIG. 1 is a perspective view of a light modifier of the present invention.

This invention relates to a light modifier that can be used to modify the characteristics of light from a light source. More particularly, the invention is directed to photographic applications where desired lighting effects can be obtained by utilizing the light modifier. This particular light modifier is wellsuited for uses where it is desired to have a very large quantity of modified light which is required when photographing large objects or several smaller objects. The facilitate the explanation of the invention, the light modifier will be describes as used for a photographic application. However, it should be understood that other uses can be made of the light modifier. The features of the invention will be more fully understood by referring to the attached drawings in connection with the following description.

The light modifier 1 is an inflatable structure having a substantially cylindrical shaped body 2. The cylindrical body portion of the light modifier is formed of a reflective panel 3 and a translucent panel 5. The reflective panel 3 is formed of a black fabric material having a silver reflective surface on one side. The reflective panel 3 is positioned so that the silver reflective surface faces the interior of the light modifier 1. Silver colored nylon or other similarily reflective surfaced fabrics may be used for the reflective panel and it is preferred that the outer surface of the fabric be black or another dark color to retard light transmission through the reflective panel. The translucent panel 5 is usually formed of a white nylon or other suitable translucent material. The reflective panel 3 generally blocks the passage of light through a portion of the body portion 2 and the silver surface acts to reflect light that comes in contact with the silver surface. Light can pass through the translucent panel 5 but the translucent panel does soften the quality of the light that passes therethrough. The body 2 of the light modifier can have a diameter from about 2 feed to about 6 feet and a length from about 3 feet to about 12 feet. It should be understood that a light modifier of the present invention can have a diameter and length of almost any size depending on the requirement for a particular use. An end panel or end cap 9 is positioned on each end of the substantially cylindrical body portion 2 of the light modifier 1. The end caps 9 can be almost any material. However, it has been found that a black material works well for the end caps. The material is usually heavier than the material for the body of the light modifier. The end caps 9 can also be formed of reflective material that is usually substantially the same as the material that is used for the reflective panel 3 on the cylindrical portion of the light modifier. The reflective material for the end caps is disposed so that the silver reflective surface faces the interior of the light modifier. The reflective material of the end caps 9 block the passage of light and the silver surface acts to reflect the light that comes into contact with the silver surface.

A passageway 13 is connected to the reflective panel 3 and the passage is in communication with the interior of the light modifier 1. The passageway 13 is formed of a flexible fabric material such as the material used for the reflective panel 3 and the end 15 of the passageway 13 that is spaced apart from the light modifier 1 terminates in an opening 17. Normally, the passageway 13 is substantially cylindrical in shape and the opening 17 is substantially circular. A blower 21 can be operatively connected to the passageway 13 to supply air under pressure to the interior of the light modifier 1. The blower has an enlarged discharge end 23 that is substantially the same shape and size as the interior of the passageway 13. A section 25 of reduced diameter is positioned behind the enlarged discharge end 23. The fabric forming the passageway 23 can be secured around the section 25 to secure the blower 21 to the passageway 13 in a manner where most of the air produced by the blower will be directed through the passageway 13 into the interior of the light modifier 1. An elastic-type securement device 27 can be positioned around the fabric of the passageway 13 of the section 25 of the blower 21 to assist in securing the blower with respect to the passageway 13. A snap-type fastener 29 can be provided on the securement device 27 to assist in positioning and securing the securement device around the fabric in section 25. However, it should be understood that other types of securement devices can be used to secure the fabric of the passageway 13 to the blower 21. The blower 21 is also provided with a moveable flap 33 that is positioned adjacent the intake opening 35 for the blower 21. The flap 33 can be moved to cover a portion of the intake opening 35 to control the volume of air that the blower 21 directs into the interior of the light modifier 1 through the passageway 13.

A closeable opening 39 is positioned in the reflective panel 3 of the light modifier 1. Normally, the closeable opening is positioned substantially parallel to the longitudinal axis of the light modifier and extends from substantially one end cap 9 to the opposed end cap 9. The closeable opening 39 can utilize a Velcro, a zipper-type or other suitable closure mechanism to allow access to the interior of the light modifier 1 while also allowing the light modifier to be sealed so that the air under pressure supplied by the blower 21 will be retained in the interior of the light modifier.

Figure 2:
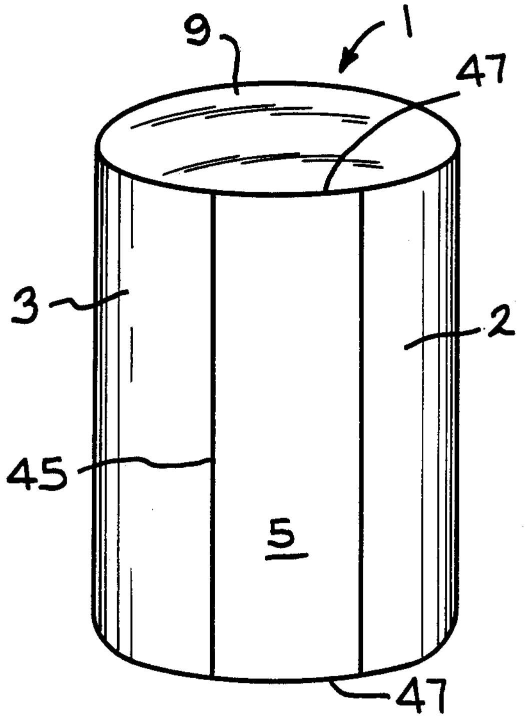
FIG. 2 is another perspective view of another embodiment of the light modifier of the present invention.
Figure 3:
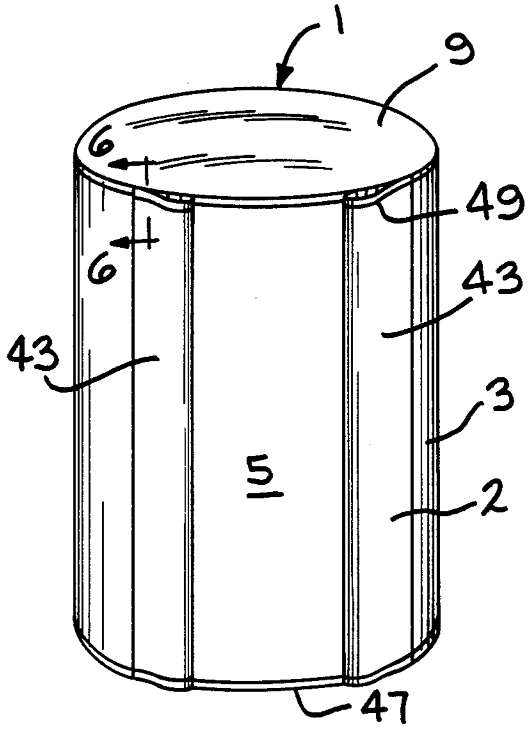
FIG. 3 is a perspective view of another embodiment of the light modifier of the present invention.
Figure 5:
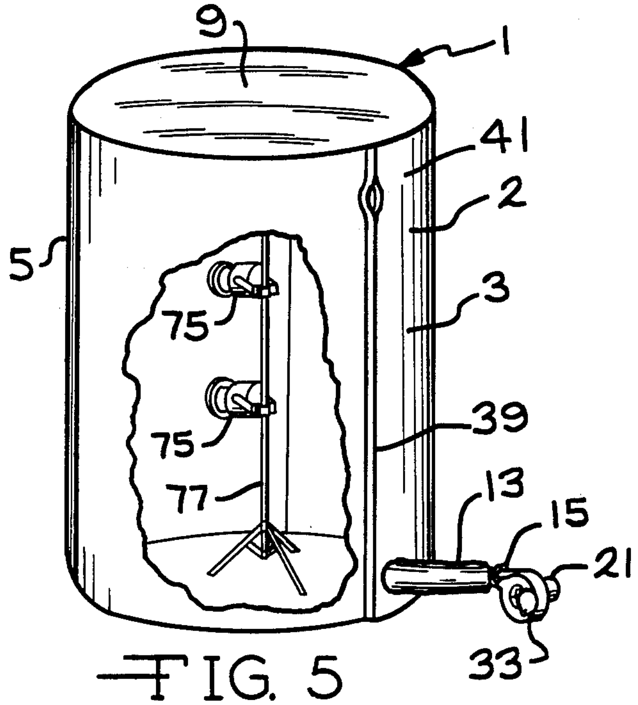
FIG. 5 is a perspective view of another embodiment of the present invention with a section broken away.
Figure 6:
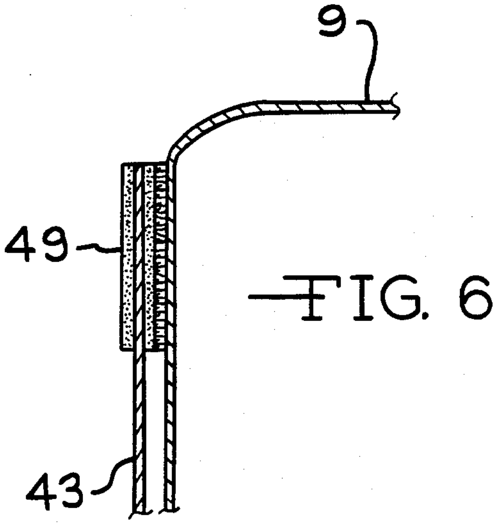
FIG. 6 is a cross-sectional view taken along line 6—6 in FIG. 3.
Figure 8:
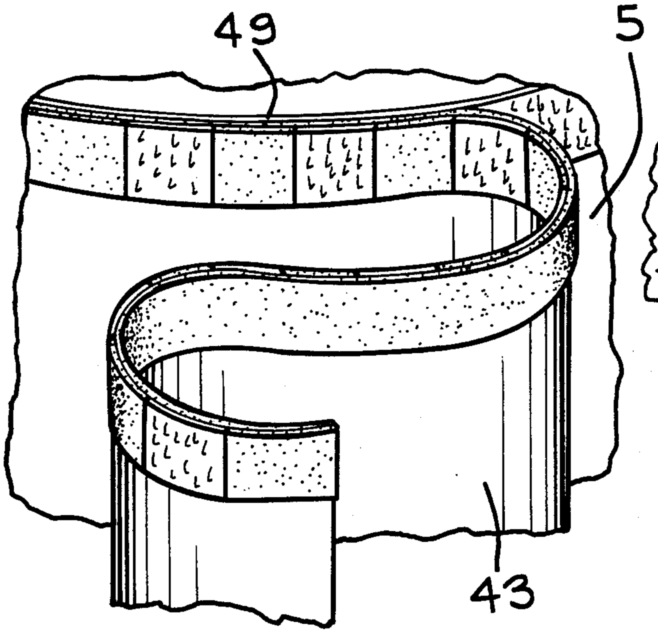
FIG. 8 is a partial perspective view of a feature of the light modifier shown in FIG. 3.
Figure 7:
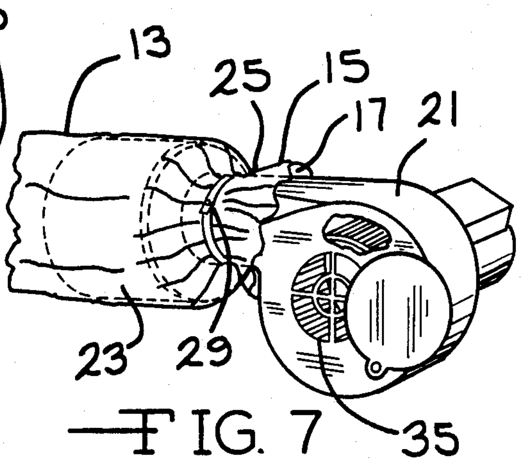
FIG. 7 is a perspective view of a portion of the present invention.

The translucent panel 5 on the light modifier 1 can be of varying width depending on the effect that is desired from the light modifier. In FIG. 1 the translucent panel 5 is shown to extend approximately 120° around the circumference of the body 2 of the light modifier. In FIG. 2 the translucent panel 5 extends approximately 35° around the circumference of the body 2 of the light modifier. In practice it has been found that the translucent panel will extend from about 10° to about 200° around the circumference of the cylindrical body of the light modifier. In most applications the translucent panel will extend about 140° around the circumference of the cylindrical body. Frequently, it is desirable to change the size of the translucent panel 5 to create different lighting effects for different items that are being photographed. To accomplish this, curtains or flaps 43 of a black material can be secured to the light modifier 1 as shown in FIG. 3. The flaps 43 can also be a reflective material that is substantially the same type of material as described for the reflective panel 3 of the light modifier. The flaps 43 are secured to the light modifier along the edges 45 of the translucent panel 5 that extend from one end cap 9 to the other end cap 9. Usually the flaps 43 are sewn to the edges 45 although a removable fastening means could be used. Usually the edges 45 of the translucent panel 5 are in parallel opposed relationship. The flaps 43 are also secured to the edges 47 of the translucent panel 5 that are adjacent the end caps 9. The edges 47 of the translucent panel are also usually in opposed substantially parallel relationship. The flaps 43 can be secured to the edges 47 using a Velcro-type fastener as shown in FIGS. 3, 5 and 8. The flaps 43 are large enough that the can essentially cover the entire translucent panel 5. When it is desired to change the size of the translucent panel 5 to obtain a particular lighting effect, the reflective material of the flaps 43 can be positioned over a portion of the translucent panel 5 to produce a translucent panel 5 having the desired width. The Velcro-type fastener 49 is used to secure the flaps to the edges 47 of the light modifier 1 to hold the flaps in the desired position. If reflective material is used for the flaps the shiny reflective material faces the interior of the light modifier and the black outer side is on the outside of the light modifier when the flaps 43 are positioned over a portion of the translucent panel 5. Accordingly, the flaps essentially extend the portion of the reflective panel 3 for the light modifier and reduce the area of the translucent panel through which light can pass from the interior of the light modifier 1. As can be seen in FIG. 8, the Velcro fastener 49 is positioned on each side of the ends of the flaps 43. This allows the portion of the flaps 43 that is not positioned over the translucent panel 5 to be folded back over on itself and secured to the Velcro fastener 49 on the edge of the flap 43 to maintain the unneeded portion of the flaps in the desired position. The flaps 43 allow the translucent panel 5 of the light modifier 1 to have a varying width to produce the desired lighting effect on an object that is to be photographed. The flaps 43 can also be secured to the edge 47 of the light modifier 1 with a zipper fastener 51 as shown in FIGS. 12 and 13. When a zipper fastener 51 is used a Velcro-type fastener 53 is positioned on the outer surface of the flaps 43 adjacent the zipper fastener 51. The Velcro fastener 53 can be used to hold the portion of the flaps 43 that are not positioned over the translucent panel 5 in the desired position as shown in FIG. 12.

Also as shown in FIGS. 10, 11 and 12, a closeable opening 57 can be positioned in the end caps 9 of the light modifier 1. As shown in these Figs., the closeable opening has a zipper-type fastener 59 that is used to open and close the opening. However, it should be understood that other types of fasteners such as Velcro fasteners could also be used for the closeable opening 57.

In the light modifier 1 shown in FIGS. 10 and 12, the passageway 13 is connected to an end cap 9 of the light modifier. A blower 21 is connected to the passageway 13 in this embodiment in the same manner as previously described.

Figure 4:
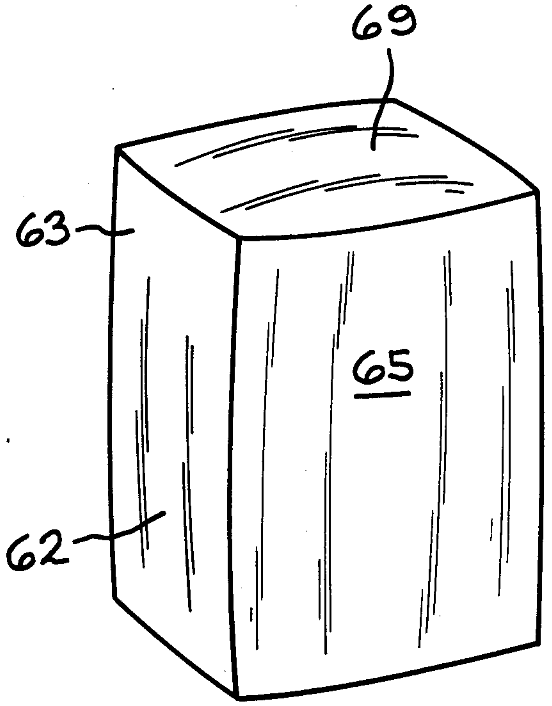
FIG. 4 is a perspective view of another embodiment of the light modifier of the present invention.

Another embodiment of the light modifier invention is shown in FIG. 4. In this embodiment, the light modifier is substantially rectangular in shape instead of a substantially cylindrical shape as previously described. In this embodiment, reflective panels 63 form three sides of the body 62 of the modifier 61. The translucent panel 65 is positioned on another side of the body 62 of the light modifier 61 and is one of the rectangular panels. Rectangular end caps 69 of a black material or a reflective material are attached to the body 62 to enclose the light modifier. In other respects the light modifier 61 shown in FIG. 4 is substantially the same as the light modifier previously described. In particular, there will be a passageway (not shown) to which a blower can be connected to supply air under pressure to the light modifier, a closeable opening that provides access to the interior of the light modifier and flaps can be incorporated onto the light modifier to change the width of the translucent panel 65.

As can be seen from the light modifier 61 of FIG. 4, it is possible to construct a light modifier of the present invention in almost any shape and the shape can be used to produce specific lighting effects on an object. However, it is anticipated that generally cylindrical shapes will be the most frequently used for the light modifiers. As shown in FIGS. 1 and 5, a photographic light source 75 is positioned in the interior of the light modifier 1. Usually, the photographic light source is positioned on a stand 77 as shown in FIG. 5. The stand 77 and light sources 75 are positioned in the interior of the light modifier through the closeable opening 39. Although two light sources have been shown as being mounted on the stand 77, it should be understood that any number of light sources can be positioned on the stand to produce the lighting effect that is desired.

Figure 9:
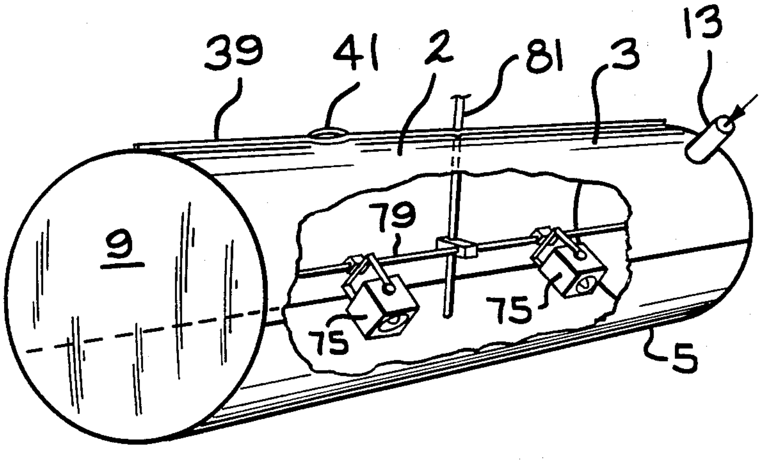
FIG. 9 is a perspective view, partially broken away, of another embodiment of the present invention.

It is also possible to mount the light sources in a different manner. As shown in FIG. 9, the photographic light sources 75 are mounted on a rod 79 and the rod is connected to a support column 81. The light sources 75 and the rod 79 are positioned in the interior of the light modifier through the closeable opening 39. A support column 81 passes through the closeable opening 39 and is secured to an appropriate support structure. In this manner the support column 81 can be used to support the photographic light sources 75 and also to maintain the light modifier in a desired position.

As shown in FIG. 10, the photographic light sources 75 can be mounted on a rod 83 that extends through the closeable openings 57 located on the end caps 9 of the light modifier. The rod 83 is connected to columns 85 that provide support for the rod 83 and the light sources 85. The columns 85 also maintain the light modifier 1 in a desired position.

FIG. 12 shows another method by which the light sources can be positioned in the interior of the light modifier 1. In this embodiment, a stand 87 is positioned with the base 89 adjacent the exterior side of one of the end caps 9. The attachment bar 91 of the stand 87 passes through the closeable opening 57 on the end cap adjacent the base 89 and into the interior of the light modifier 1. Suitable photographic light sources (not shown) can be positioned on the attachment bar 91 in the interior of the light modifier 1. Usually, the attachment bar 91 extends from the closeable opening 57 that is positioned on the end cap 9 that is spaced apart from the base 89 of the stand 87. FIG. 11 shows in more detail how the closeable opening 57 can be positioned around the attachment bar 91.

The light source 75 can be positioned in the interior of the light modifier 1 so that the light produced by the light modifier is aimed directly at the translucent panels, aimed at the reflective panel 3 or light sources can be amined at the translucent panel and the reflective panel. When a stronger more localized type of diffused light is desired the light source is directed toward the translucent panel 5. This causes a relatively strong but diffused light to be cast upon the subject matter or area to be photographed, thereby allowing the subject matter to be properly illuminated without creating heavy well-defined shadows in the background of the picture. The intensity of the light emitted from the translucent panel can also be varied by moving the light source with respect to the translucent panel. The farther the light source 75 is spaced apart from the translucent panel 5, the more the light produced can radially disperse to fill a larger portion of the translucent panel and reduce the intensity of the light passing through the translucent panel.

If a more subtle, broad type of diffuse light is required, the light source 75 can be aimed at the reflective panel 3. By aiming the light source at the reflective panel 3, the light pattern is broken up more as the light is reflected before it passes through the translucent panel 5. As a result, the light emitted from the light modifier is much softer than when the light source is aimed at the translucent panel. The intensity of the light emitted from the translucent panel 5 can also be varied by moving the light source with respect to the reflective panel 3. The further the light source is spaced apart from the reflective panel the more the light can radially disperse to contact a larger portion of the reflective panel. The larger the area of the reflective panel 3 that is filled with light the larger the pattern of reflective light that is directed towards the translucent panel 5 and as the pattern of the light increases in size the intensity of the light decreases. Thus, the position of the light source in the light modifier can be used to vary the intensity and pattern of the light emitted from the light modifier.

The cylindrical or parabolic shape for the translucent panel 5 and reflective panel 3 provide an advantage when illuminating an object. If the light source 75 is directed at the translucent panel, the substantially parabolic shape allows the light to fan out in a radial fashion and illuminate a large area. Thus, the light can fill the surface of the translucent panel 5. The intensity of the light is strongest in the center of the translucent panel where the light source is directly aimed. The intensity of the light decreases progressively as it moves from the center of the translucent panel 5 towards the edges of the translucent panel. Thus, the shape of the translucent panel produces varying levels or intensity of light on different areas of the translucent panel and this can be used to the desired lighting effects on the object that is to be illuminated.

When the light source 75 is directed at the reflective panel 3 the substantially parabolic shape allows the light to fan out in a radial fashion and strike the reflective panel. The reflective panel reflects the light from the light source towards the translucent panel 5. Because of the substantially parabolic shape of the reflective panel 3, the light that passes through the translucent panel has substantially the same intensity throughout the area of the translucent panel. The reflected light travels varying distances in reaching the translucent panel because of the shape of the reflective panel. The varying distances of travel for the reflected light produces light of a substantially uniform intensity at the translucent panel. The reflected light also substantially fills the translucent panel.

In some applications more than one light source 75 can be positioned in the light modifier 1. The light sources can be directed at the translucent panel 5 and the reflective panel 3 to produce a combination of lighting effects on the object that is to be illuminated.

In operation the stand 77 is positioned in the interior of the light modifier 1 as shown in FIG. 5. The stand 77 and the photographic light source 75 mounted thereon are positioned in the interior of the light modifier through the closeable opening 39. The stand 77 helps to maintain the general shape of the light diffuser while the blower 21 attached to passageway 13 provides air under pressure to the interior of the light modifier to inflate the light modifier. When fully inflated the light modifier assumes a substantially cylindrical shape. To maintain the light modifier 1 in the inflated form it is necessary for the blower 21 to continue to supply air under pressure to the interior of the light modifier. However, in some applications it is possible to move the flap 33 over the intake opening 35 on the blower 22 to reduce the volume of air flow supplied by the blower 21 to the passageway 13. It has also been found to be desirable to have a small vent hole 41 in the closeable opening 39 to allow air to escape from the interior of the light modifier 1. With the vent hole 41 there is a escape for the air under pressure that is supplied to the light modifier 1 by the blower 21. This keeps the light modifier 1 from having an undesirable level of pressure build up on the interior of the light modifier that could unduly stretch the panels of the light modifier or cause a failure at one of the seams. The vent hold 41 can be made by not totally closing the closeable opening 39. The size of the vent hold 41 can be varied to ensure that the light modifier stays fully inflated without having an excessive pressure build up in the light modifier. Utilizing the vent hold 41 also allows the air inside of the light modifier 1 to be circulated as air is supplied from the blower 21 through the passageway 13 and air exits the light modifier from the vent hold 41. This creates a constant flow of air through the interior of the light modifier and helps to keep the temperature on the interior of the light modifier from building up when the photographic light sources 75 are in operation.

The light modifier shown in FIG. 9 is positioned around the light sources 75 that are positioned on rods 29 that is connected to support column 81. The light sources 75 and rod 79 are positioned on the interior of the light modifier through the closeable opening 39. The closeable opening is secured around the support column 81 and this helps to hold the light modifier in the proper position while air under pressure is being supplied to the interior of the light modifier through passageway 13 from a blower (not shown). Once the light modifier is substantially inflated a vent hold 41 can be positioned in the closeable opening 39 to allow some air to escape from the interior of the light modifier to offset the input that is supplied from the blower. For the embodiment shown in FIG. 9, the light modifier would normally be suspended above the floor of the photography studio. Normally, the support column 81 would be connected to the ceiling, a side wall or an exterior support structure that can be used to support the light modifier.

The light modifier shown in FIG. 10 has the rod 83 on which the light sources 75 are mounted passing through the closeable openings 57 in the end caps 9 of the light modifier. The closeable openings are closed around the rod 83 to maintain the light modifier 1 in the proper position with respect to the rod 83. The rod 83 is then secured to columns 85 that are secured to an appropriate support structure. Usually, the light modifier as shown in FIG. 10 is suspended from a ceiling, side wall or other support structure and is elevated above the objects that are to be photographed. A blower (not shown) is connected to the passageway 13 for supplying air under pressure to the interior of the light modifier. The blower can be connected to the rod 83 or one of the columns 85.

The light modifier shown in FIG. 12 is supported on a stand 87 having a base 89. The attachment bar 91 of the stand 87 passes through a closeable opening 57 located on the end cap 9 adjacent to the base 89. The closeable opening 57 is secured around the attachment bar 91 to maintain the proper position for the light modifier 1 with respect to the attachment bar 91. Usually, the attachment bar 91 will also extend through the closeable opening 57 that is in the end cap 9 that is spaced apart from the base 89. Again, the closeable opening 57 will be secured around the attachment bar 91 to maintain the proper spacing for the light modifier 1 with respect to the attachment bar. When the light modifier is properly positioned on the stand 87 the blower 21 can supply air under pressure through the passageway 13 to the interior of the light modifier.

As can be appreciated from the above description for the various embodiments of the light modifier, almost any type of stand or support can be used to mount the photographic light sources in the interior of the light modifier. It is also possible to use almost any type of photographic light source to produce the lighting effect that is desired. It is also possible to use varying numbers of light sources with the light modifier and to vary the position of the light sources in the interior of the light modifier to produce different lighting effects. The lighweight fabric panels of the light modifier allows the light modifier to be easily positioned in a variety of locations with respect to the objects to be photographed to produce the desired lighting effect. When the light modifier is no longer required or it is necessary to move the light modifier to another location it is easy to disconnect the blower 21 and open one of the closeable openings to allow the air to escape from the light modifier. Once this has been done, the light sources can be removed from the interior of the light modifier and the light modifier can be folded up into a relatively compact lightweight package that is easily transported or stored. Since only a small, lightweight blower is required to inflate the light modifier, the blower is also easily packaged with the light modifier on in a separate container.

In some applications it may be desirable to vary the size of the translucent panel 5 to achieve a different light effect for a particular object that is being photographed. To accomplish this, flaps 43 have been positioned adjacent the outer edges 45 of the translucent panel 5 as shown in FIGS. 3 and 12. With these flaps 43 a light modifier 1 can be utilized having a large translucent panel 5 and the panel can be made the desired size by placing the flaps 43 over a portion of a translucent panel 5. Although the flaps 43 are shown as changing the size of the translucent panel 5 in one direction, it would be possible to attach additional flaps (not shown) to the light modifier 1 to change the size of the translucent panel in the other direction. Thus, it would be possible to change the width and height of the translucent panel to achieve the desired lighting effect from the light modifier.

For the light modifier shown in FIG. 3, the flaps 43 are held in place along edge 47 of the end caps 9 by a Velcro-type fastener. The Velcro fasteners is positioned on both sides of the flaps 43 as shown in FIG. 8. This allows a portion of the flaps 43 that is not positioned over the translucent panel 5 to be secured to the Velcro in the manner shown in FIG. 8 to retain the unused portion of the flaps 43 in the proper position.

For the embodiment shown in FIGS. 12 and 13, a zipper-type fastener 51 is used to position the flaps 43 along edge 47 of the end caps 9. The zipper is advanced until the flaps 43 cover the desired portion of the translucent panel 5. The flaps 43 have a Velcro fastener 53 positioned on the outside of the flaps. This allows the portion of the flaps 43 not used to cover a portion of the translucent panel 5 to be folded back and held in the proper position by the Velcro fastener.

From the above it will be clear that the translucent panel 5 of the light modifier 1 can be modified in size to produce the desired lighting effect for a particular object that is to be photographed. This provides a great deal of flexibility for producing a wide range of lighting effects that can be required in a photography studio. This is particularly true when different types of photographic light sources can be utilized, the position of the light sources can be varied, the light from the light sources can be reflected or not reflected and the size of the translucent panel can be varied to produce almost any type of lighting effect. The above description is given for the sake of explanation. Various modifications and substitutions, other than those mentioned, can be made without departing from the scope and spirit of the following claims.

What I claim is:

1. A light modifier for use with a light source to direct light onto an object spaced apart from said modifier that is to be illuminated, said light modifier comprising:

an inflatable structure having a translucent panel and a reflective panel, said reflective panel being disposed with its reflective surface facing the interior of said inflatable structure, said reflective surface acting to reflect light from said light source through said translucent panel onto said object;

a passageway connected to said inflatable structure, said passageway being in communication with the interior of said inflatable structure, said passageway being disposed for supplying a fluid under pressure to the interior of said inflatable structure; and at least one closeable opening positioned in said inflatable structure to provide access to the interior of said light modifier and to allow said light source to be positioned in said interior of said light modifier, whereby said light source is positioned within said light modifier such that light from said light source is directed at said translucent panel to produce one level of diffused light and the light from said light source is directed at said reflective panel whereby said light is reflected off said reflective panel prior to passing through said translucent panel to produce diffused light of a lower intensity.

2. The modifier of claim 1, wherein said inflatable structure has a body portion comprised of said translucent panel and said reflective panel with an end panel at each end of said body portion forming an enclosed inflatable structure.

3. The modifier of claim 2, wherein said body portion is substantially cylindrical and said end panels are a black material.

4. The modifier of claim 3, wherein said end panels are made of a material having a reflective surface, said reflective surface of said end panels being disposed to face the interior of said inflatable structure.

5. The modifier of claim 4, wherein a closeable opening is positioned in each end panel.

6. The modifier of claim 5, wherein said closeable opening in said end panels passes through the center point of said end panel and extends across at least one third of the diameter of said end panel.

7. The modifier of claim 6, wherein said closeable opening in said end panels include a Velcro seal for releasably joining the edges of said panel that define said opening whereby said opening can be reusably opened and closed.

8. The modifier of claim 6, wherein said closeable opening in said end panels includes a zipper for releasably joining the edges of said panel that define said opening whereby said opening can be reusably opened and closed.

9. The modifier of claim 3, wherein said translucent panel extends in an arc from about 10° to about 200° around the outer perimeter of said substantially cylindrical body portion and said reflective panel extends around the remainder of the outer perimeter of said body portion.

10. The modifier of claim 9, wherein a moveable curtain formed of a reflective material is attached to said reflective panel of said body portion, said curtain being attached to said reflective panel adjacent to said translucent panel, said curtain being moveable to cover a portion of said translucent panel to alter the pattern of light through said reflective panel.

11. The modifier of claim 9, wherein a closeable opening is positioned on said reflective panel that forms said body portion.

12. The modifier of claim 11, wherein said closeable opening is disposed substantially parallel to the longitudinal axis of said substantially cylindrical body portion.

13. The modifier of claim 12, wherein said closeable opening extends along substantially the length of said body portion from one end panel to said other end panel.

14. The modifier of claim 13, wherein said closeable opening includes a Velcro seal for releasably joining the edges of said panel that define said opening whereby said opening can be reusably opened and closed.

15. The modifier of claim 13, wherein said closeable opening includes a zipper for releasably joining the edges of said panel that define said opening whereby said opening can be reusably opened and closed.

16. The modifier of claim 3, wherein said translucent panel and said reflective panel are substantially parabolic in shape, said parabolic shape allowing light from said light source to fan out and illuminate a larger area of said translucent panel when light is directed at said translucent panel, the intensity of the light being strongest in the area of said translucent panel where the light is directly aimed, the intensity of the light decreases when moving in said translucent panel away from where the light from said light source is directed, when light from said light source is directed at said reflective panel said substantially parabolic shape of said reflective panel causes the light to be reflected towards said translucent panel, the light substantially fills said translucent panel and said reflected light has substantially the same intensity throughout said translucent panel.

17. The modifier of claim 1, wherein said translucent panel comprises a while nylon material.

18. The modifier of claim 1, wherein said reflective panel comprises a nylon material having a silver reflective interior surface and a black exterior surface.

19. The modifier of claim 1, wherein a blower is operatively connected to said passageway, said blower supplying air under pressure to the interior of said inflatable structure to inflate said structure.

20. The modifier of claim 19, wherein the output of said blower can be varied to supply the desired quantity of air to said structure to maintain said structure in said inflated condition.

21. The light modifier of claim 20, wherein a vent hole can be provided in said inflatable structure, said vent hold acting to balance the air being suppled by said blower to maintain said inflatable structure at the proper inflation level, said vent hold allowing air to circulate through said modifier to cool the interior of said modifier.

22. The modifier of claim 21, wherein said vent hold is provided by having an opening in said closeable opening, the size of said vent hole being variable to balance the air supplied by said blower to said modifier.

23. A light modifier for use with a photographic light source to direct light onto an object that is to be illuminated, said light modifier comprising:

an inflatable structure having a substantially cylindrical body portion formed of a translucent panel and a reflective panel, said reflective panel being disposed with its reflective surface facing the interior of said inflatable structure to reflect light from said light source through said translucent panel, and end panel positioned on each end of said body portion to enclose said inflatable structure, said end panels formed of a dark material;

a passageway connected to said inflatable structure, said passageway being in communication with the interior of said inflatable structure, said passageway being disposed for supplying a fluid under pressure to the interior of said inflatable structure;

a source of air under pressure being operatively connected to said passageway, said air under pressure acting to inflate and to maintain said inflatable structure in the inflated condition; and at least one closeable opening positioned in said inflatable structure to provide access to the interior of said panel of said body portion, said closeable opening beng disposed substantially parallel to the longitudinal axis of said substantially cylindrical body portion, said closeable opening extending substantially the length of said body portion from one end panel to said other end panel, and to allow said light source to be positioned in said interior of said light modifier, whereby said light source is positioned within said light modifier such that light from said light source is directed at said translucent panel to produce one level of diffused light and the light from said light source is directed at said reflective panel whereby said light is reflected off said reflective panel prior to passing through said translucent panel to produce diffused light of a lower intensity.

24. The modifier of claim 23, wherein said reflective panel and said translucent panel are substantially parabolic.

25. The modifier of claim 23, wherein said translucent panel extends in an arc from about 10° to about 200° around the outer perimeter of said substantially cylindrical body portion and said reflective panel extends around the remainder of the outer perimeter of said body portion.

26. The modifier of claim 23, wherein said closeable opening includes a Velcro seal for releasably joining the edges of said panel that define said opening whereby said opening can be reusably opened and closed.

27. The modifier of claim 23, wherein said closeable opening includes a zipper for releasably joining the edges of said panel that define said opening whereby said opening can be reusably opened and closed.

28. The modifier of claim 23, wherein a moveable curtain formed of a dark material is attached to said reflective panel of said body portion, said curtain being moveable to cover a portion of said translucent panel to alter the pattern of light through said reflective panel.

29. The modifier of claim 23, wherein a closeable opening is positioned in each end panel.

30. The modifier of claim 29, wherein said closeable opening in said end panels passes through the center point of said end panel and extends across at least one third of the diameter of said end panel.

31. The modifier of claim 30, wherein said closeable opening in said end panels include a Velcro seal for releasably joining the edges of said panel that define said opening whereby said opening can be reusably opened and closed.

32. The modifier of claim 30, wherein said closeable opening in said end panels includes a zipper for releasably joining the edges of said panel that define said opening whereby said opening can be reusably opened and closed.

33. The modifier of claim 23, wherein said translucent panel comprises a while nylon material.

34. The modifier of claim 23, wherein said reflective panel comprises a nylon material having a silver reflective interior surface and a black exterior surface.

35. The modifier of claim 23, wherein said source of air under pressure is a blower that is operatively connected to said passageway, said blower supplying air under pressure to the interior of said inflatable structure to inflate said structure.

36. The light modifier of claim 35, wherein a vent hold can be provided in said inflatable structure, said vent hole acting to balance the air being suppled by said blower to maintain said inflatable structure at the proper inflation level, said vent hole allowing air to circulate through said modifier to cool the interior of said modifier.

37. The modifier of claim 36, wherein said vent hole is provided by having an opening in said closeable opening, the size of said vent hole being variable to balance the air supplied by said blower to said modifier.

38. A method for modifying light used for photographic purposes comprising;

positioning a photographic light source inside of an inflatable light modifier, said light modifier having a translucent panel and a reflective panel;

supplying air under pressure to said light modifier to inflate said light modifier;

exhausting air from said inflatable light modifier through a vent hole to maintain air flow through said light modifier, said air flow acting to cool the interior of said light modifier and to exhaust heat from said photographic light source; and, directing said light source at said translucent panel to produce one level of diffused light and directing said light source at said reflective panel whereby said light is reflected off of said reflective panel prior to passing through said translucent panel to produce a lower intensity of diffused light.

39. The method of claim 38, in which said light source is positioned inside said inflatable light modifier through a closeable opening in said reflective panel.

40. The method of claim 39, in which said light source can be moved in the interior of said light modifier to vary the intensity and pattern of light from said light source emitted through said translucent panel of said light modifier.

41. The method of claim 38, in which movable curtains of a dark material can be positioned over at least a portion of said translucent panel to alter the pattern of light emitted from said light modifier.

42. A light modifier comprising:

a substantially cylindrical body portion formed of a translucent panel and a reflective panel, said reflective panel being disposed with its reflective surface facing the interior of said body portion, an end panel positioned on each end of said body portion to enclose said body portion, said end panels being a dark material;

at least one closeable opening positioned in said light modifier to provide access to the interior of said light modifier, said closeable opening being positioned in said reflective panel of said body portion, said closeable opening being disposed substantially parallel to the longitudinal axis of said substantially cylindrical body portion, said closeable opening extending substantially the length of said body portion from one end panel to said other end panel; and at least one light source positioned in the interior of said body portion, said light source can be directed at said translucent panel to produce one level of diffused light and said light source can be directed at said reflective panel to produce a lower intensity of diffused light, said light from said light source passing through said translucent panel to produce the desired lighting on an object that is to be illuminated.

43. The modifier of claim 42, wherein a vent hole is positioned in said body portion, said vent hole allowing air flow in said body portion to reduce heat buildup from said light source.

44. The modifier of claim 42, wherein said light source can be moved in the interior of said body portion to vary the intensity and pattern of light from said light source that is emitted through said translucent panel.

45. The modifier of claim 42, wherein said translucent panel and said reflective panel are substantially parabolic in shape.

46. A light modifier for use with a light source to direct light onto an object spaced apart from said modifier that is to be illuminated, said light modifier comprising;

an inflatable structure having a substantially cylindrical body portion formed by a translucent panel and a reflective panel, an end panel positioned at each end of said body portion forming an enclosed structure, said translucent panel extending in an arc from about 10° to about 200° around the outer perimeter of said substantially cylindrical body portion and said reflective panel extending around the remainder of said outer perimeter of said body portion, said reflective panel being disposed with its reflective surface facing the interior of said inflatable structure, and reflective surface acting to reflect light from said light source through said translucent panel onto said object;

a passageway connected to said inflatable structure, said passageway being in communication with the interior of said inflatable structure, said passageway being disposed for supplying a fluid under pressure to the interior of said inflatable structure;

a moveable curtain formed of a dark material being attached to said reflective panel of said body portion, said curtain being attached to said reflective panel adjacent said translucent panel, said curtain being moveable to cover a portion of said translucent panel to alter the pattern of light passing through said translucent panel; and at least one closeable opening positioned in said inflatable structure to provide access to the interior of said light modifier and to allow said light source to be positioned in said interior of said light modifier, whereby said light source is positioned within said light modifier such that light from said light source is directed at said translucent panel to produce one level of diffused light and the light from said light source is directed at said reflective panel whereby said light is reflected off said reflective panel prior to passing through said translucent panel to produce diffused light of a lower intensity.

47. The light modifier of claim 46 wherein said moveable curtain is formed of a reflective material having a dark surface and a reflective surface, said reflective surface of said curtain facing said translucent panel whereby said reflective surface reflects light from said light source back into said interior of said light modifier.

48. A light modifier for use with a photographic light source to direct light onto an object that is to be illuminated, said light modifier comprising;

an inflatable structure having a substantially cylindrical body portion formed of a translucent panel and a reflective panel, said reflective panel being disposed with its reflective surface facing the interior of said inflatable structure to reflect light from said light source through said translucent panel, an end panel positioned on each end of said body portion to enclose said inflatable structure, said end panels being formed of a dark material;

a passageway connected to said inflatable structure, said passageway being in communication with the interior of said inflatable structure said passageway being disposed for supplying a fluid under pressure to the interior of said inflatable structure;

a source of air under pressure being operatively connected to said passageway, said air under pressure acting to inflate and to maintain said inflatable structure in the inflated condition;

at least one closeable opening positioned in said inflatable structure to provide access to the interior of said panel of said body portion, said closeable opening being disposed substantially parallel to the longitudinal axis of said substantially cylindrical body portion, said closeable opening extending substantially the length of said body portion from one end panel to said other end panel, and to allow said light source to be positioned in said interior of said light modifier, whereby said light source is positioned within said light modifier such that light from said light source is directed at said translucent panel to produce one level of diffused light and the light from said light source is directed at said reflective panel whereby said light is reflected off said reflective panel prior to passing through said translucent panel to produce diffused light of a lower intensity; and a moveable curtain formed of a dark material being attached to said reflective panel of said body portion, said curtain being moveable to cover a portion of said translucent panel to alter the pattern of light passing through said translucent panel.

49. The light modifier of claim 48 wherein said moveable curtain is formed of a reflective material having a dark surface and a reflective surface, said reflective surface facing said translucent panel.

* * * * *